(12) United States Patent
Lorenz et al.

(10) Patent No.: US 9,797,470 B2
(45) Date of Patent: Oct. 24, 2017

(54) TORSIONAL VIBRATION DAMPER AND TORSIONAL VIBRATION DAMPING METHOD

(71) Applicant: ZF FRIEDRICHSHAFEN AG, Friedrichshafen (DE)

(72) Inventors: Daniel Lorenz, Bad Kissingen (DE); Thomas Weigand, Schweinfurt (DE); Tobias Höche, Hofheim i. UFr. (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 232 days.

(21) Appl. No.: 14/646,474

(22) PCT Filed: Nov. 18, 2013

(86) PCT No.: PCT/EP2013/074001
§ 371 (c)(1),
(2) Date: May 21, 2015

(87) PCT Pub. No.: WO2014/095186
PCT Pub. Date: Jun. 26, 2014

(65) Prior Publication Data
US 2015/0260256 A1 Sep. 17, 2015

(30) Foreign Application Priority Data

Dec. 17, 2012 (DE) .................. 10 2012 223 383
Oct. 10, 2013 (DE) .................. 10 2013 220 483

(51) Int. Cl.
*F16F 15/12* (2006.01)
*F16F 15/131* (2006.01)
(Continued)

(52) U.S. Cl.
CPC .... *F16F 15/13157* (2013.01); *F16F 15/1206* (2013.01); *F16H 2001/2881* (2013.01); *F16H 2001/324* (2013.01); *Y10T 74/19023* (2015.01)

(58) Field of Classification Search
None
See application file for complete search history.

(56) References Cited

U.S. PATENT DOCUMENTS 5,720,475 A    2/1998  Duclos
8,166,842 B2*  5/2012  Rieger .................. F16H 3/006
                                                    74/329

(Continued)

FOREIGN PATENT DOCUMENTS

DE    102011007117    10/2011
DE    102011007118    12/2011
(Continued)

*Primary Examiner* — Justin Holmes
(74) *Attorney, Agent, or Firm* — Cozen O'Connor

(57) ABSTRACT

A torsional vibration damping arrangement has an input-side connection component, an output-side connection component, a first torque transmission path arranged between the input-side connection component and the output-side connection component, a second torque transmission path arranged parallel to the first torque transmission path between the input-side connection component and the output-side connection component ( ), a phase shifter arrangement and a torque adjusting arrangement ( ). The phase shifter arrangement is arranged in the first torque transmission path or second torque transmission path and is configured to generate a phase shift of rotational irregularities guided via the first torque transmission path relative to rotational irregularities guided via the second torque transmission path. The torque adjusting arrangement is configured to change a torque transmission ratio between a first torque component which is transmitted via the first torque (Continued)

transmission path and a second torque component which is transmitted via the second torque transmission path.

17 Claims, 10 Drawing Sheets

(51) Int. Cl.
    *F16H 1/28*     (2006.01)
    *F16H 1/32*     (2006.01)

(56) References Cited

U.S. PATENT DOCUMENTS

| | | |
|---|---|---|
| 8,991,530 B2 | 3/2015 | Lorenz |
| 2010/0096788 A1 | 4/2010 | Farahati |
| 2010/0257966 A1* | 10/2010 | Rieger .................... F16H 3/006 74/331 |
| 2010/0282019 A1* | 11/2010 | Rieger .................... F16H 3/006 74/665 D |
| 2011/0139279 A1* | 6/2011 | Lundberg ............ F16H 61/0021 137/565.11 |
| 2013/0085030 A1 | 4/2013 | Doegel |
| 2013/0203541 A1 | 8/2013 | Lorenz |
| 2014/0047949 A1 | 2/2014 | Lorenz |

FOREIGN PATENT DOCUMENTS

| | | |
|---|---|---|
| DE | 102011075242 | 12/2011 |
| DE | 102011075244 | 12/2011 |
| DE | 112009002406 | 1/2012 |

\* cited by examiner

TORSIONAL VIBRATION DAMPER AND TORSIONAL VIBRATION DAMPING METHOD

PRIORITY CLAIM

This is a U.S. national stage of application No. PCT/EP2013/074001, filed on Nov. 18, 2013. Priority is claimed on the following application: Country: Germany, Application No.: 10 201 2 223 383.0, Filed: Dec. 17, 2012 and Country: Germany, Application No.: 10 201 2 220 483.3, Filed: Oct. 10, 2013, the content of which is incorporated herein by reference in its entirety.

FIELD OF THE INVENTION

The present invention relates to vibration damping systems and particularly to a torsional vibration damping arrangement and a method for damping torsional vibrations.

BACKGROUND OF THE INVENTION

In many machines, the various movement sequences of the various machine parts also bring about unwanted vibrations. These unwanted vibrations can have a negative influence on the life of the machine or on user comfort, for example. Especially in powertrains constructed with internal combustion engines, a constant torque can generally not be introduced into a powertrain owing to the fact that periodic ignitions occur in the internal combustion engine and the energy that is released as a result is converted into a rotational movement of the crankshaft. The torque delivered by the crankshaft and also the rotational speed of the crankshaft are subject to fluctuations and oscillations, generally speaking, rotational irregularities. Since rotational irregularities of this kind may be noticeable during driving operation, it is desirable to eliminate them as far as possible.

For example, by employing force accumulators or energy accumulators, that is, for example, springs or moving masses, the energies occurring in rotational irregularities of the kind mentioned above are temporarily stored and are then conveyed into the powertrain in such a way that a smoother speed curve and/or torque curve can be achieved. However, systems of this type usually require extensive space.

Another possibility is to use phase shifter arrangements which, by initially splitting (power split) and then recombining the transmitted torque, can ensure that a destructive superposition of vibration components occurs in the torque to be transmitted as a result of the phase shift introduced. Ideally, a virtually complete elimination of rotational irregularities takes place at least in a particularly critical frequency range.

U.S. Pat. No. 8,991,531 shows a torsional vibration damping arrangement with two torque transmission paths, at least one of which has a phase shifter arrangement which generates a phase shift of rotational irregularities in the two torque transmission paths. The phase shifter arrangement is constructed substantially according to the working principle of a dual mass flywheel in which two masses, i.e., essentially the primary side and the secondary side, which oscillate with respect to one another against the action of the spring arrangement are provided with a desired vibration behavior through selection of the spring stiffness on the one hand and of the mass ratios and/or mass inertia at the primary side and secondary side on the other hand. A vibratory system of this type has a resonant frequency. In the frequency range below the resonant frequency, a vibratory system of this type vibrates subcritically, i.e., excitation and reaction of the system take place substantially simultaneously. When the resonant frequency is exceeded, a phase jump occurs so that excitation and reaction of the system occur substantially out of phase with one another, i.e., the system operates supercritically. This phase jump which ideally has a maximum value of 180° can be utilized to achieve the desired reduction of rotational irregularities in that the torque vibration component which has been phase-shifted in this way is superposed on the torque vibration component that has not been phase-shifted.

To further reduce rotational irregularities and in order to allow future requirements of automobile manufacturers to be met, systems with power capability appreciably superior to that of present-day systems are required. For example, the lower speed range is being focused on to an increasing extent because of increasing excitation, e.g., due to downspeeding (reduced engine speed) and/or downsizing (reduced engine displacement). In addition, there are new requirements, e.g., for engines with cylinder cutout, start/stop systems and/or different levels of hybridization, which cannot be mastered to a sufficient degree, if at all, with present-day concepts for reducing rotational irregularities.

Therefore, there is a need for providing a concept for torsional vibration damping which makes it possible to improve the reduction of rotational irregularities.

SUMMARY OF THE INVENTION

A torsional vibration damping arrangement according to the present invention comprises an input-side connection component, an output-side connection component, a first torque transmission path arranged between the input-side connection component and the output-side connection component, a second torque transmission path arranged parallel to the first torque transmission path between the input-side connection component and the output-side connection component, a phase shifter arrangement and a torque adjusting arrangement. The phase shifter arrangement is arranged in the first torque transmission path or second torque transmission path and is configured to generate a phase shift of rotational irregularity guided via the first torque transmission path relative to rotational irregularities guided via the second torque transmission path. Further, the torque adjusting arrangement is configured to change a torque transmission ratio between a first torque component which is transmitted via the first torque transmission path and a second torque component which is transmitted via the second torque transmission path.

Embodiments of the present invention are based on the recognition that an improved elimination of rotational irregularities can be achieved by varying the torque transmission ratio of the torque transmission paths in different frequency ranges. Further, for example, the critical rotational irregularities for different drive speeds of different drives are established in different frequency ranges. Through the ability to change the torque transmission ratio, for example, the frequency range resulting from the adjustable torque transmission ratio can be adapted to the speed-dependent critical frequency range with excellent reduction in rotational irregularities. In this way, not only can a good elimination of rotational irregularity be achieved for one speed of the drive, but an appreciably improved torsional vibration damping or an appreciably improved reduction of rotational irregularities can be achieved corresponding to the variability (e.g., discrete or continuous) for at least two different speeds or for an entire speed range of the drive. By reducing rotational irregularities, the life of the machine (e.g., a vehicle) utilizing the torsional vibration damping arrangement can be prolonged and the driving comfort of the machine can be enhanced through the reduction of noticeable vibrations.

In some embodiments, the torque adjusting arrangement has at least two planet gears having different outer diameters and at least two output-side ring gears which have correspondingly different inner diameters and which are operatively connected to the planet gears. Further, the torque adjusting arrangement has a clutch arrangement which is configured to adjustably bring one of the at least two planet gears, respectively, in operative connection with a planet gear of a coupling arrangement. The planet gear of the coupling arrangement is operatively connected to the first torque transmission path via a planet gear carrier and is operatively connected to the second torque transmission path via an input-side ring gear. Through the possibility of connecting the output to ring gears having different inner diameters, the torque transmission ratio in the torque transmission paths can be influenced and can accordingly adopt two different values. Through this change in the torque transmission ratio, for example, the reduction in rotational irregularities can be improved for two different drive speeds.

Some embodiments relate to a torsional vibration damping arrangement with a torque adjusting arrangement having at least two planet gears which have different outer diameters and which are nonrotatably connected to one another and at least two output-side ring gears which have correspondingly different inner diameters and which are operatively connected to the planet gears. Further, the torque adjusting arrangement has a clutch arrangement which is configured to adjustably bring one of the at least two output-side ring gears, respectively, in operative connection with the output-side connection component. Through the possibility of connecting the output to ring gears of different inner diameters, the torque transmission ratio in the torque transmission paths can be influenced and can accordingly adopt two different values. Through this change in the torque transmission ratio, the reduction in rotational irregularities can be improved for two different drive speeds, for example.

According to some embodiments, the torque adjusting arrangement comprises an electric motor. In this regard, the torque adjusting arrangement is configured such that the electric motor can introduce a torque into the first torque transmission path or into the second torque transmission path or can remove a torque from the first torque transmission path or from the second torque transmission path in order to change the torque transmission ratio. The torque transmission ratio can be changed continuously by means of the electric motor so that a good reduction in rotational irregularities can be achieved for an entire speed range of the drive.

BRIEF DESCRIPTION OF THE DRAWINGS

Embodiments of the present invention will be described in more detail in the following referring to the accompanying Figures in which.

DETAILED DESCRIPTION OF THE PRESENTLY PREFERRED EMBODIMENTS

Figure 1:
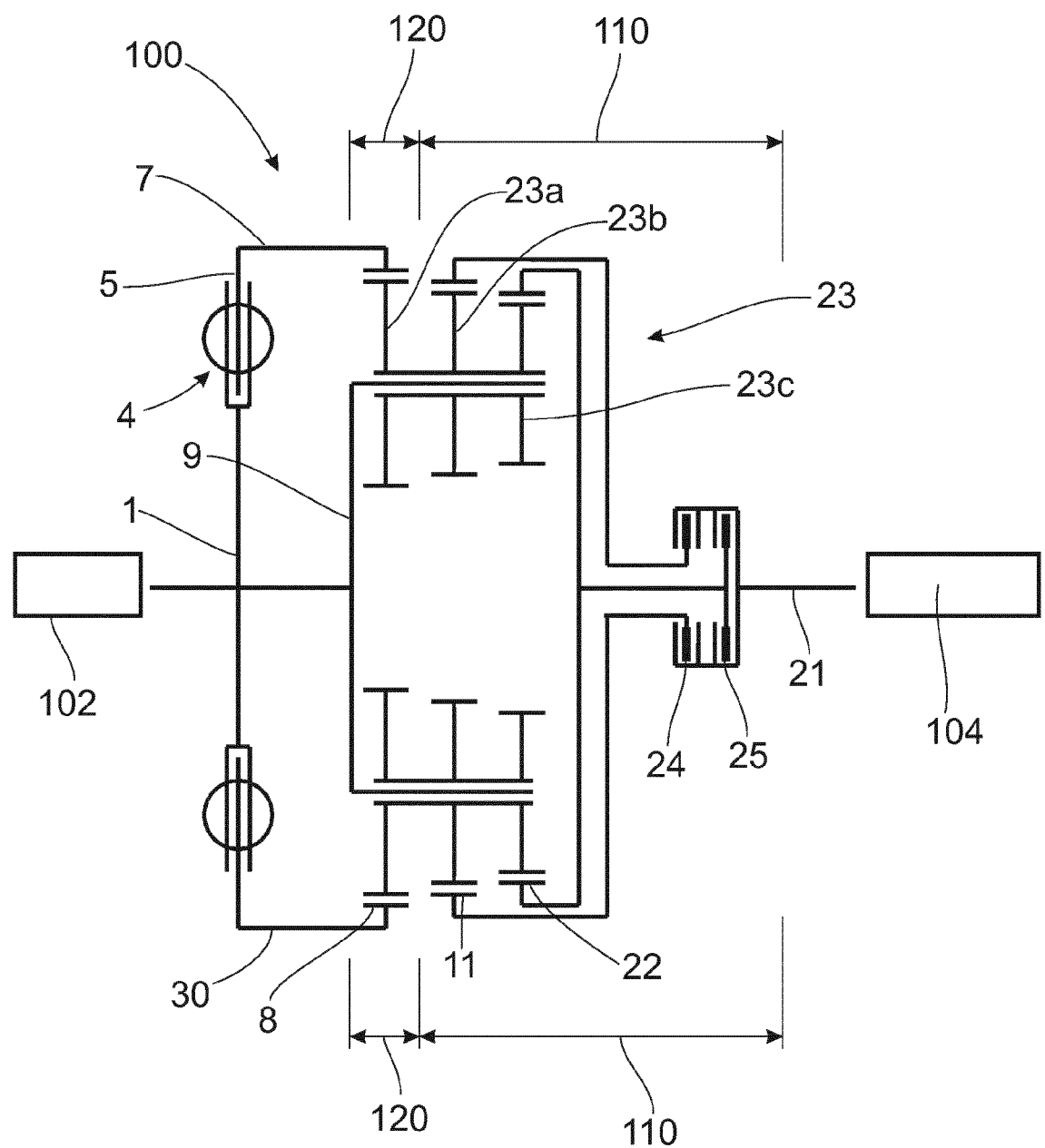
FIG. 1 is a schematic representation of a torsional vibration damping arrangement with output-side ring gears having different inner diameters.

In the following, objects and functional units having identical or similar functional characteristics may in some cases be denoted by identical reference numerals in different embodiments described herein. Further, collective reference numerals may be used for components and objects which occur more than once in an embodiment or diagram but which are described collectively with respect to one or more features. Components or objects which are denoted by identical reference numerals or collective reference numerals may be constructed identically or possibly also differently with respect to one or more or all features, for example, their dimensions, unless otherwise explicit or implicit from the description. Further, optional features of the various embodiments can be combined with one another or substituted for one another.

Embodiments for torsional vibration damping arrangements will be described more fully in the following. These embodiments have in common that they have an input-side connection component, an output-side connection component, a first torque transmission path, a second torque transmission path, a phase shifter arrangement and a torque adjusting arrangement. The specific implementation of the individual elements may be carried out identically, similarly or differently. Further, the embodiments can have optional, additional or alternative configurations.

Some component parts of the torsional vibration damping arrangements described in the following are operatively connected relative to one another or operatively connected to one another. In this regard, forces can be transmitted from one component part to the other. An operative connection can be, for example, a positive engagement connection or a frictional engagement connection. A positive engagement connection can be achieved, for example, via toothed wheels meshing with one another. Alternatively, a frictional engagement connection can be achieved by rollers pressing against one another. Positive engagement connections via toothed wheels are mostly used in the following for the described examples, but the various component parts can also be operatively connected to one another in another way. In the following, operative connections are generated by the positive engagement connection of meshing toothed wheels.

However, for example, alternatively, a frictionally engaging operative connection can also be generated by rollers pressing against one another. As it pertains to a diameter of a planet gear, ring gear or the like, the diameter of a toothed wheel can refer to a maximum diameter with respect to the peaks of the teeth, a minimum diameter with respect to the valleys of the teeth, or a mean diameter as mean between minimum diameter and maximum diameter, and vice versa for a ring gear.

Referring to the first embodiment shown in FIG. 1, the general features will be described and then the exemplary specific implementation of the generally defined elements will be discussed.

FIG. 1 shows a schematic cross section through a torsional vibration damping arrangement 100 which has an input-side connection component 1, an output-side connection component 21, a first torque transmission path arranged between the input-side connection component 1 and the output-side connection component 21, a second torque transmission path arranged parallel to the first torque transmission path between the input-side connection component 1 and the output-side connection component 21, a phase shifter arrangement 4 and a torque adjusting arrangement 110. The phase shifter arrangement 4 is arranged in the first torque transmission path or second torque transmission path and is configured to generate a phase shift of rotational irregularities guided via the first torque transmission path relative to rotational irregularities guided via the second torque transmission path. Further, the torque adjusting arrangement is configured to change a torque transmission ratio between a first torque component which is transmitted via the first torque transmission path and a second torque component which is transmitted via the second torque transmission path.

An improved reduction of rotational irregularities in different frequency ranges can be achieved by changing the torque transmission ratio. In many drives, critical rotational irregularities occur at different speeds of the drive in different frequency ranges. Through the variability of the torque transmission ratio, the frequency range in which the rotational irregularities can be favorably reduced can be adapted to the speed-dependent range with critical rotational irregularities so that a better reduction in rotational irregularities can be achieved for different speeds or a speed range of the drive.

The input-side connection component 1 may be any component part to which a drive 102 can be connected. For example, the input-side connection component 1 can be a shaft or a component part for connecting to a shaft (e.g., primary plate). The torsional vibration damping arrangement 100 can be connected to any drive 102, e.g., an internal combustion engine or electric motor, via the input-side connection component 1. The output-side connection component 21 may be any component part that can be connected to an output 104. For example, the output-side connection component 21 can be a shaft (e.g., transmission input shaft) or a component part that can be connected to a shaft. The output-side connection component 21 can be connected to any output 104, e.g., to a transmission. The torsional vibration damping arrangement 100 can be used in any machines in which a reduction of rotational irregularities is required. For example, the torsional vibration damping arrangement can be used in a powertrain of a vehicle (e.g., passenger car, truck, watercraft or aircraft).

The two torque transmission paths extend between the input-side connection component 1 and the output-side connection component 21. The first torque transmission path or the second torque transmission path has the phase shifter arrangement 4. The two torque transmission paths form a power split in which the first torque component is transmitted via the first torque transmission path and the second torque component is transmitted via the second torque transmission path. In this respect, a torque transmission path can run via any quantity of component parts which are operatively connected to one another. An operative connection of this type can be carried out by means of a positive engagement connection, a frictional engagement connection or a bonding connection. For example, a nonpositive or frictional engagement connection is brought about by static friction, a bonding connection is brought about by molecular or atomic interactions and forces, and a positive engagement connection is brought about by a geometric joining of the relevant mating parts.

With the phase shifter arrangement 4, rotational irregularities in the first torque transmission path or second torque transmission path can be shifted out of phase with rotational irregularities guided via the first torque transmission path such that a superposition of the out-of-phase rotational irregularities can result in a destructive interference of vibration components which can result in an appreciable reduction in output-side rotational irregularities.

The torque transmission ratio of the torque components transmitted via the two torque transmission paths can be changed by means of the torque adjusting arrangement 110. The torque components can be defined in various ways, but this does not change the fact that the frequency range in which the most extensive elimination of rotational irregularities takes place can be influenced by changing the torque transmission ratio. For example, the torque component can be a percent value of the torque which is transmitted to the output-side connection component 21 and transmitted via the respective torque transmission path. Alternatively, the torque component can be an absolute amount of torque that is transmitted via the respective torque transmission path. However, a torque component can also be defined differently.

The torque transmission ratio can be changed by the torque adjusting arrangement 110 as a function of any parameters. For example, the torque adjusting arrangement 110 can have control electronics (68) for this purpose which receive sensor signals, for instance, and control the change in the torque transmission ratio depending on the sensor signals. Sensor signals of this type can represent, for example, a drive speed, a temperature, a parameter of an operator's control or another measurement parameter. For example, the speed of the input-side connection component 1 can be measured or the speed of the drive can be measured directly, and the torque transmission ratio can be changed depending on the measurement signal. Alternatively, the change in the torque transmission ratio can also be realized purely mechanically (or mechanically and electrically in combination). For example, a speed-dependent change in the torque transmission ratio can be implemented mechanically making use of centrifugal force.

Accordingly, the torque adjusting arrangement 110 can optionally change the torque transmission ratio so that the torque transmission ratio is greater or smaller (depending on the rotational irregularity characteristic of the drive employed) at a first speed of the input-side connection component 1 than at a second speed of the input-side connection component 1 when the first speed is less than the second speed. For example, when an internal combustion engine is used, the torque transmission ratio can be changed in such a way that it is greater at a first speed than at a second speed when the first speed is less than the second speed. In this way, the reduction of rotational irregularities can be improved at different drive speeds (discretely or continuously).

The torque transmission splits into the at least two torque transmission paths between the input-side connection component 1 and the output-side connection component 21. At the end of the at least two torque transmission paths, these torque transmission paths are brought together again in a common torque transmission path and run, for example, as combined torque transmission path up to the output-side connection component 21. In so doing, the torques transmitted by the different torque transmission paths can be superposed at the location where they are combined. To this end, the torsional vibration damping arrangement 100 can have a coupling arrangement 120. This coupling arrangement 120 can superpose the first torque component (transmitted via the first torque transmission path) with the second torque component (transmitted via the second torque transmission path). The coupling arrangement 120 can be realized in different ways. The coupling arrangement 120 can be an independent unit or, e.g., part of the torque adjusting arrangement 110.

The torque adjusting arrangement 110 can also be realized in different ways. Depending on the implemented variant, the torque adjusting arrangement 110 can also be arranged at different positions inside the torsional vibration damping arrangement 100. Accordingly, the torque adjusting arrangement 110 can be arranged in the first torque transmission path, in the second torque transmission path or between the coupling arrangement 120 and the output-side connection component 21 as is shown in the following embodiments.

In the torsional vibration damping arrangement 100 shown in FIG. 1, the torque adjusting arrangement 110 has at least two planet gears 23b, 23c which have different outer diameters and which are nonrotatably connected to one another and at least two output-side ring gears 11, 22 which have correspondingly different inner diameters and which are operatively connected to the planet gears 23b, 23c. Further, the torque adjusting arrangement 110 has a clutch arrangement 24, 25 which is configured to adjustably bring one of the at least two output-side ring gears 11, 22, respectively, into operative connection with the output-side connection component 21. By choosing between two ring gears 11, 22 of different sizes which can be brought into operative connection with the output-side connection component 21, the torque transmission ratio of the two torque transmission paths changes because the gear ratio is changed. Two component parts are connected to one another nonrotatably (also expressed as being fixed with respect to rotation relative to one another or rigid against rotation), for example, when torsional forces can be continuously transmitted between the component parts.

The clutch arrangement has, for example, a first clutch 24 for a first ring gear 11 of the two output-side ring gears and a second clutch 25 for the second ring gear 22 of the two output-side ring gears. The two clutches 24, 25 can be arranged adjacently in axial direction, for example. Accordingly, less installation space is needed in radial direction.

Similar to the torque adjusting arrangement 110, the coupling arrangement 120 can also be configured in different ways. In the example shown in FIG. 4, the at least two planet gears 23b, 23c of the torque adjusting arrangement 110 are nonrotatably connected to a planet gear 23a of the coupling arrangement 120. Planet gear 23a of coupling arrangement 120 is connected to the first torque transmission path via a planet gear carrier 9 carrying the planet gears 23a, 23b, 23c which are fixed with respect to relative rotation, and planet gear 23a of coupling arrangement 120 is operatively connected to an input-side ring gear 8 of the second torque transmission path. The planet gear carrier 9, the input-side ring gear 8 and the at least one planet gear 23a of the coupling arrangement 120 form a planetary gear construction by which the torques of the two torque transmission paths can be superposed, and the superposed torque can be guided further via the planet gears 23b, 23c of the torque adjusting arrangement 110 which are nonrotatably connected to the at least one planet gear 23a of the coupling gear arrangement 120. The planet gear 23a of the coupling arrangement 120 and the two planet gears 23b, 23c of the torque adjusting arrangement 110 form a planet gear pairing 23 which can comprise one or more parts. The torque transmission paths can be guided together again in a simple manner by the planetary gear construction forming the coupling arrangement 120. Planet gear 23a of coupling arrangement 120 can have the same diameter as, or a different diameter than, one of the two planet gears 23b, 23c of the torque adjusting arrangement 110. For example, planet gear 23a of coupling arrangement 120 can have the largest diameter of the three planet gears 23a, 23b, 23c as is shown in FIG. 1.

Two different torque transmission ratios can be adjusted by the clutch arrangement 24, 25. Depending on the rotational irregularity characteristic of the drive being used, the ring gear having the smaller inner diameter can be used for high speeds or for low speeds. For example, for internal combustion engines or another drive, the torque adjusting arrangement 110 can be configured such that a smaller inner diameter of an output-side ring gear 22 is brought into operative connection with the output-side connection component 21 via the clutch arrangement 24, 25 at a first speed of the input-side connection component 1 than at a second speed of the input-side connection component 1 when the first speed is less than the second speed.

The torque adjusting arrangement 110 can also have more than two planet gears with different diameters so that more than two different torque transmission ratios can be adjusted.

Figure 2:
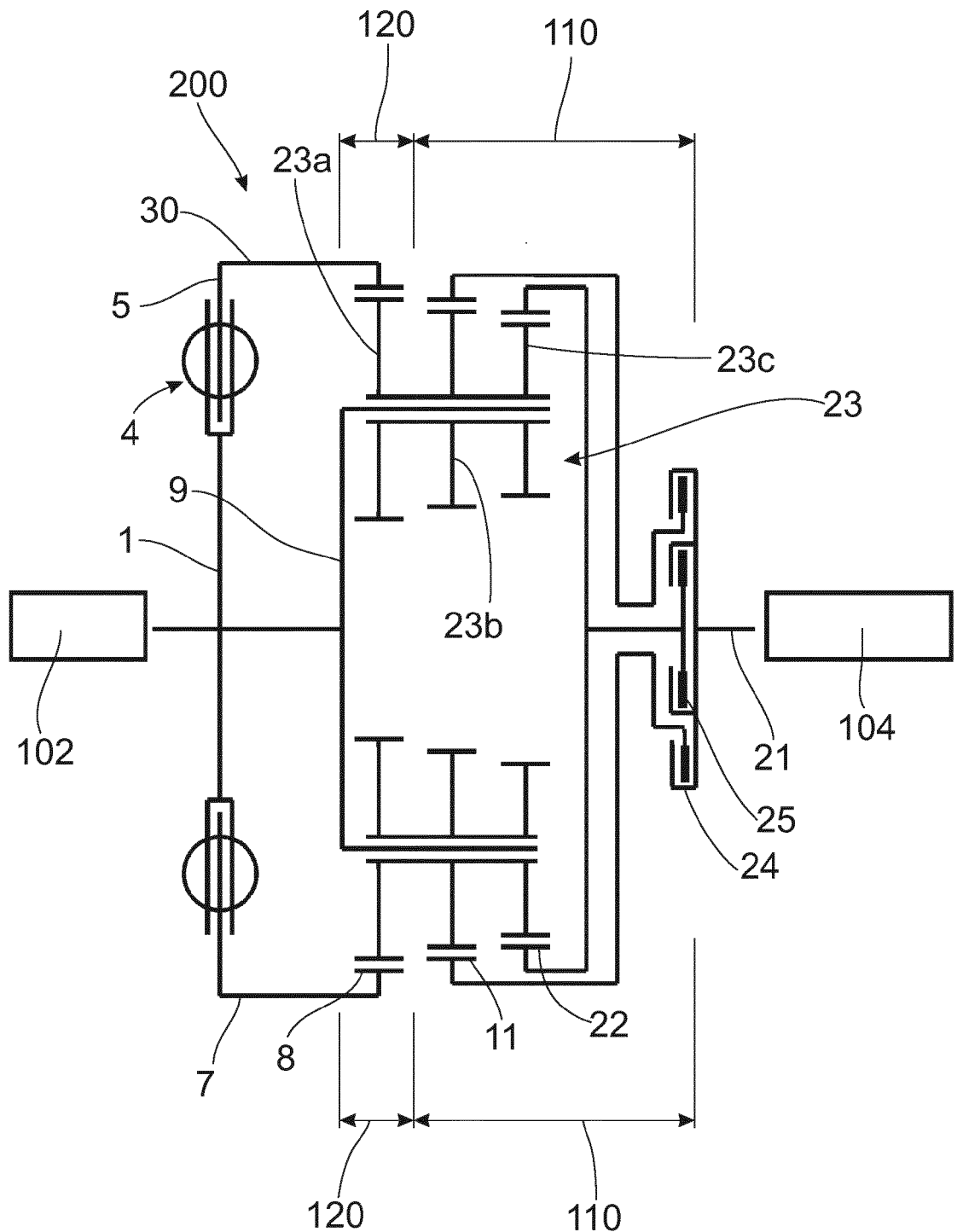
FIG. 2 is a schematic representation of a further torsional vibration damping arrangement with output-side ring gears having different inner diameters.

FIG. 2 shows a schematic representation of a further torsional vibration damping arrangement 200 according to an embodiment of the present invention. The construction of torsional vibration damping arrangement 200 corresponds for the most part to that of the torsional vibration damping arrangement shown in FIG. 1, but the first clutch 24 and the second clutch 25 are arranged adjacently in radial direction rather than in axial direction. Accordingly, less installation space is required in axial direction (parallel to the axis of rotation of the torsional vibration damping arrangement). The clutches 24, 25 of the clutch arrangement have a clutch part for both output-side ring gears 11, 22 which faces radially outward and is enclosed in a pincer-like manner on the output side by a clutch part. In other respects, the remarks pertaining to the torsional vibration damping arrangement shown in FIG. 1 apply in the present case.

Figure 3:
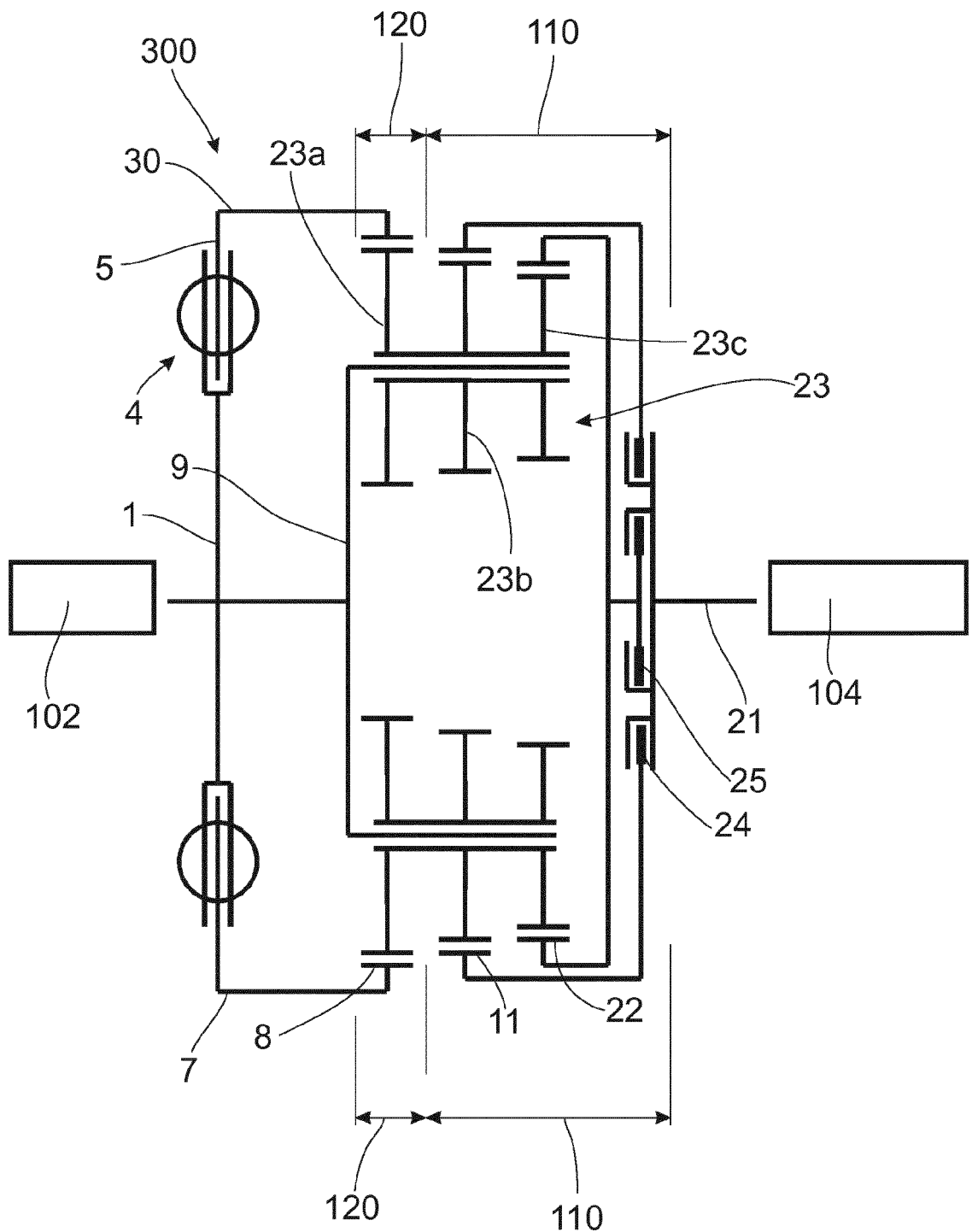
FIG. 3 is a schematic representation of a further torsional vibration damping arrangement with output-side ring gears having different inner diameters.

FIG. 3 shows a schematic representation of a further torsional vibration damping arrangement 300 according to another embodiment of the present invention. The construction of torsional vibration damping arrangement 300 corresponds for the most part to the construction of the torsional vibration damping arrangement shown in FIG. 2. However, the clutches 24, 25 do not have a clutch part facing radially outward for the two output-side ring gears 11, 22; rather, the clutch 24 of one output-side ring gear 22 (the output-side ring gear with the smaller inner diameter) has an input-side clutch part facing radially outward and the second clutch 25 of the second output-side ring gear 11 (output-side ring gear with larger inner diameter) has a clutch part facing radially inward. The input-side clutch parts are enclosed on the output side by a pincer-shaped clutch part. In other respects, the remarks pertaining to the torsional vibration damping arrangements shown in FIGS. 1 and 2 apply to torsional vibration damping arrangement 300.

The embodiments shown in FIGS. 1 to 3 show, for example, a power split with switchable output gear sets (planet gears nonrotatable). In the examples shown in FIGS. 1 to 3, the planet gear carrier 9 carries, for example, the stepped planet gears 23(a-c) with three toothings, at least two of which have a different number of teeth (different diameters). All three toothings are nonrotatably connected to one another. The two output ring gears 11, 22 are operatively connected to the stepped planet gears 23. The frictional engagement between the output ring gears 11, 22 and the secondary flywheel (e.g., for the output-side connection component or connected thereto) is produced via clutches 24, 25.

Figure 4:
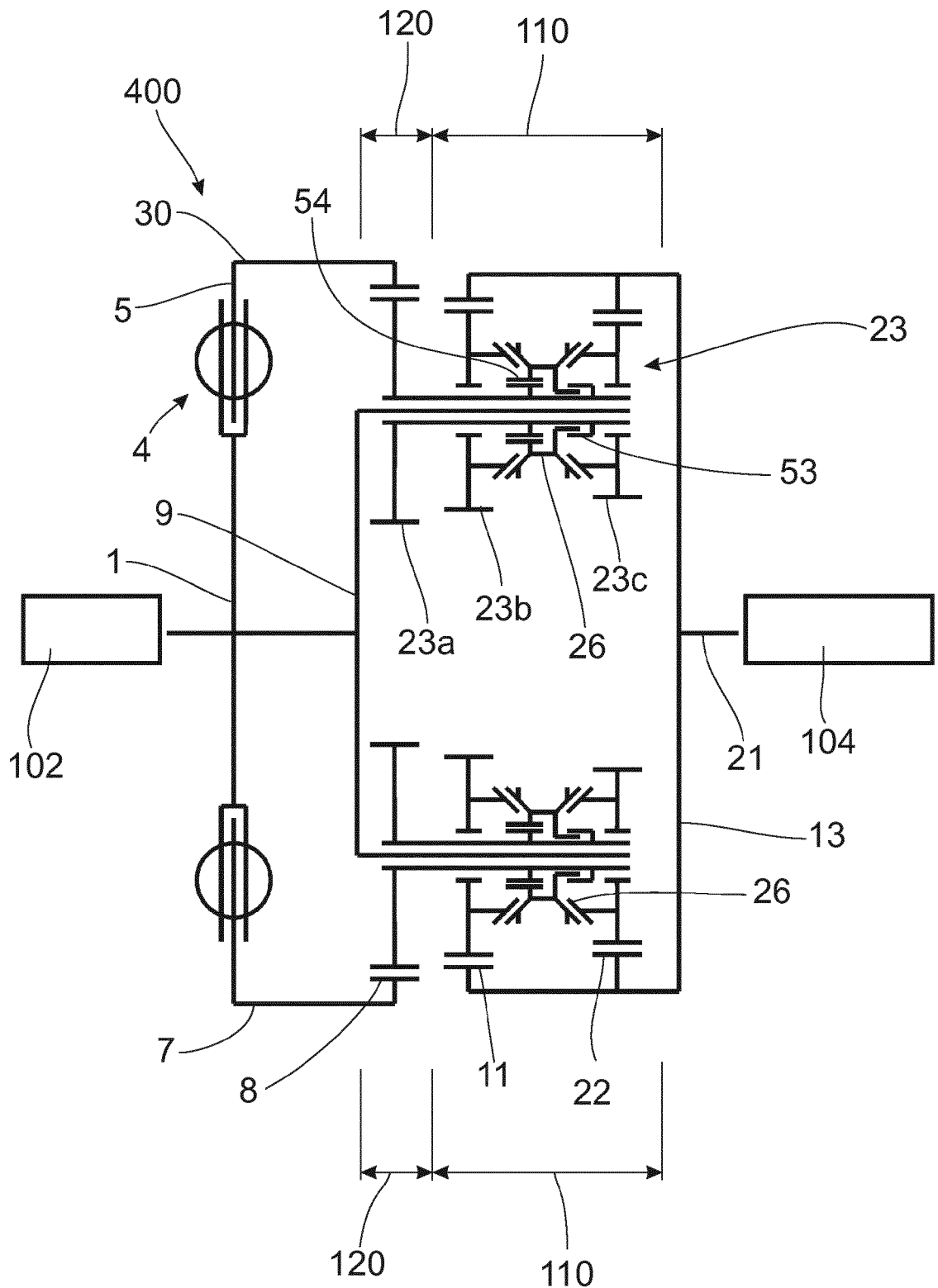
FIG. 4 is a schematic representation of a further torsional vibration damping arrangement with output-side ring gears having different inner diameters.

FIG. 4 shows a schematic representation of a further torsional vibration damping arrangement 400 according to yet another embodiment of the present invention. The construction of torsional vibration damping arrangement 400 corresponds for the most part to the construction of the torsional vibration damping arrangement shown in FIG. 1. However, the clutch arrangement 26 is not arranged between the output-side ring gears 11, 22 and the output-side connection component 21 but rather between a planet gear 23a of the coupling arrangement 120 and planet gears 23b, 23c of the torque adjusting arrangement 110. In other words, the torque adjusting arrangement 110 has at least two planet gears 23b, 23c with different outer diameters and at least two output-side ring gears 11, 22 which have correspondingly different inner diameters and which are operatively connected to planet gears 23b, 23c. Further, the torque adjusting arrangement 110 has a clutch arrangement 26 which is configured to adjustably bring one of the at least two planet gears 23b, 23c, respectively, into operative connection with a planet gear 23a of the coupling arrangement 120. Planet gear 23a of coupling arrangement 120 is operatively connected to the first torque transmission path via a planet gear carrier 9 and is operatively connected to the second torque transmission path via an input-side ring gear 8.

In the example in FIG. 4, the planet gear carrier 9 carries the stepped planet gear 23 with three toothings. The planet gears 23 which are operatively connected to the output ring gears 11, 22 have at least two different numbers of teeth (different diameters) and are rotatably supported relative to the teeth (the planet gear of the coupling arrangement) which are operatively connected to the input ring gear. A nonrotatable connection to the output ring gears 11, 22 can be produced via a friction clutch 26, for example. The clutch 26 can have an actuator 53 for a friction clutch and an axial guide 54 of a clutch sleeve of the friction clutch. The output-side ring gears 11, 22 are nonrotatably connected to one another, for example.

FIG. 4 shows, for example, a power split with switchable output gear sets (output ring gears nonrotatable).

Referring to FIGS. 1-4, for example, for implementing a variable gear ratio, two or more output ring gears 11, 22 (with different diameters) and the associated planet gears are installed. The planet gears can be alternately switched by clutch mechanisms 24, 25, 26 into the power flow between planet carrier 9 (planet gear carrier) and secondary flywheel 13 (or output-side connection component). The clutch mechanism can be implemented by means of friction engagement, positive engagement or bonding engagement.

Alternatively, it is also possible to switch two of more ring gears or planetary gear sets into the power flow between the input-side intermediate mass 30 (or the input-side connection component) and the planet gear carrier 9. In other words, the torque adjusting arrangement 110 can be arranged in the second torque transmission path and can have at least two planet gears which have different outer diameters and which are nonrotatably connected to one another and at least two input-side ring gears which have correspondingly different inner diameters and which are operatively connected to the planet gears. Further, the torque adjusting arrangement 110 can have a clutch arrangement which is configured to adjustably bring one of the at least two input-side ring gears, respectively, into operative connection with the second torque transmission path. Accordingly, for example, the principle shown in FIG. 1 with two or more output-side ring gears having different diameters can be implemented on the input side.

In the examples shown in FIGS. 1-4, the first torque transmission path extends from the input-side connection component 1 (e.g., primary plate) to the planet gear carrier 9 of the coupling arrangement 120. The second torque transmission path extends from the input-side connection component 1 (e.g., primary plate) via the phase shifter arrangement 4 (e.g., spring set), a hub disk 5 and a ring gear carrier 7 to the input-side ring gear 8 of the coupling arrangement 120.

In the examples shown in FIGS. 1-4, for example, less torque can be transmitted via the second torque transmission path with the phase shifter arrangement 4 at low speeds at which high rotational irregularities can occur than at high speeds. To this end, a high gear ratio, i.e., the small output-side ring gear 22, can be used at low speeds, and a low gear ratio, i.e., the larger output-side ring gear 11, can be used at high speeds. Accordingly, more torque can be transmitted via the second torque transmission path at high speeds than at low speeds.

Figure 5:
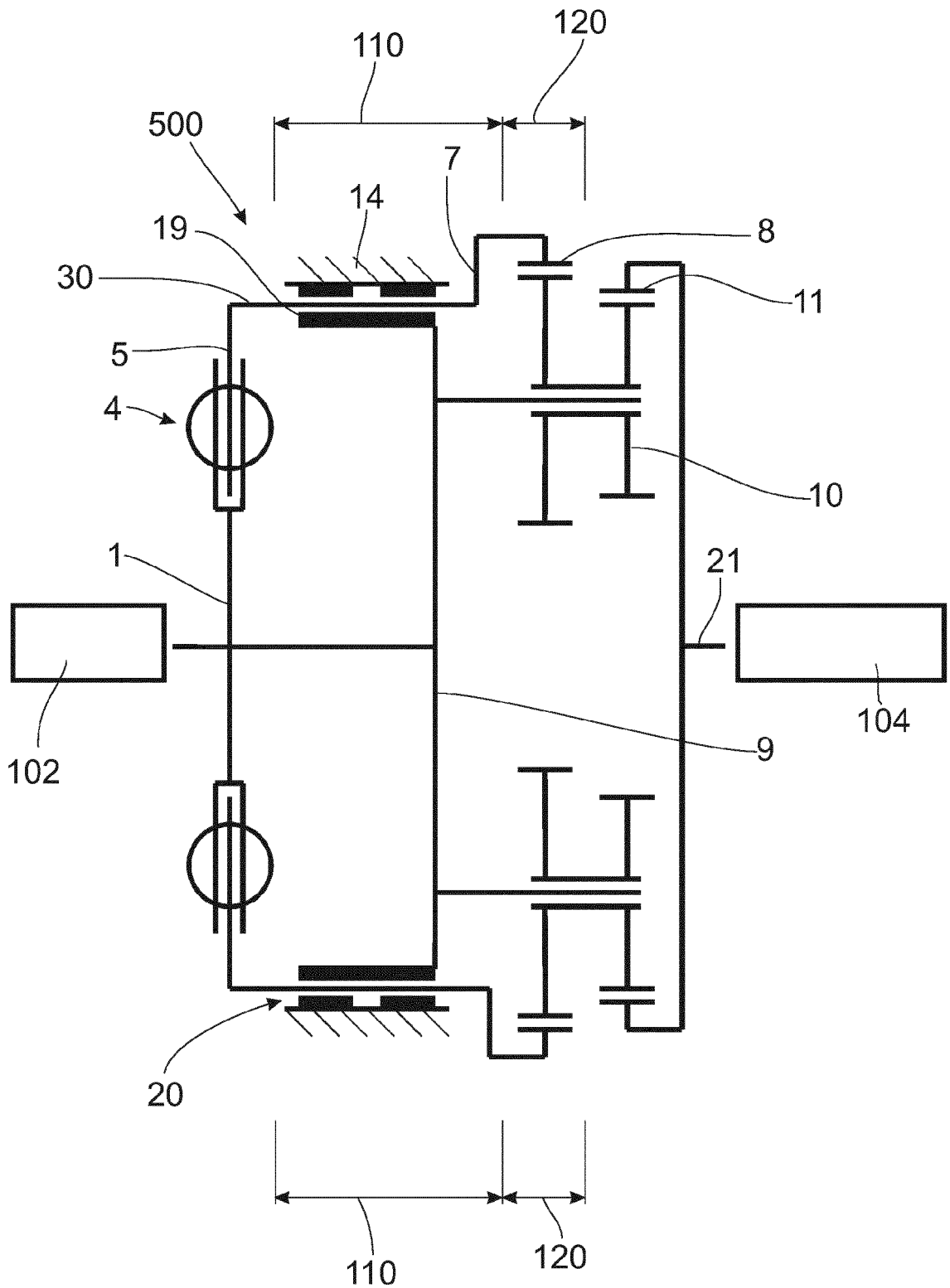
FIG. 5 is a schematic representation of a torsional vibration damping arrangement with an electric motor.

FIG. 5 shows a schematic representation of a further torsional vibration damping arrangement 500 according to a further embodiment of the present invention. In this case, the torque adjusting arrangement 110 has an electric motor 19, 20. The torque adjusting arrangement 110 is configured such that the electric motor 19, 20 introduces a torque into the first torque transmission path or second torque transmission path or removes a torque from the first torque transmission path or second torque transmission path in order to change the torque transmission ratio. Supplementally, the remarks pertaining to the torsional vibration damping arrangements shown in FIGS. 1 to 4 apply in the present case.

In the example shown in FIG. 5, the input-side connection component 1 (e.g., primary plate), an optional cover plate, not shown, and the planet carrier 9 with stepped planets 10 (planet gear pairing) form the primary side (the first torque transmission path). The primary plate 1 is connected to a ring gear carrier 7 via spring set 4 (phase shifter arrangement), a hub disk 5 and shroud plates 6. An input ring gear 8 is located at the ring gear carrier 7. The planet carrier 9 carries the stepped planet gears 10. The output ring gear 11 is operatively connected to the stepped planet gears 10. The planet gear carrier 9 is nonrotatably connected to a rotor 19 of the electric motor as is illustrated. A stator 20 (of the electric motor) can be nonrotatably connected to the transmission housing 14. Between these two components, the intermediate mass 30 or one of the component parts connected to it can have a rotational degree of freedom (i.e., can rotate through between the rotor and stator).

With the electric motor, the planet gear carrier 9 can be acted upon in a speed-dependent and/or load-dependent manner by an additional torque which can damp higher engine orders or can reinforce the main engine order so as to enable a good or ideal decoupling.

For example, the torque transmission ratio can be influenced by means of the electric motor such that at a first speed of the input-side connection component 1 the first torque component corresponds to the same as −0.4 times (or between −0.3 times and 0.5 times) the second torque component, and at a second speed of the input-side connection component 1 the first torque component corresponds to the same as −0.1 times (or between −0.05 times and −0.2 times) the second torque component when the first speed is less than the second speed.

A power split with fixed variable drive can be realized with the embodiment shown in FIG. 5.

Figure 6:
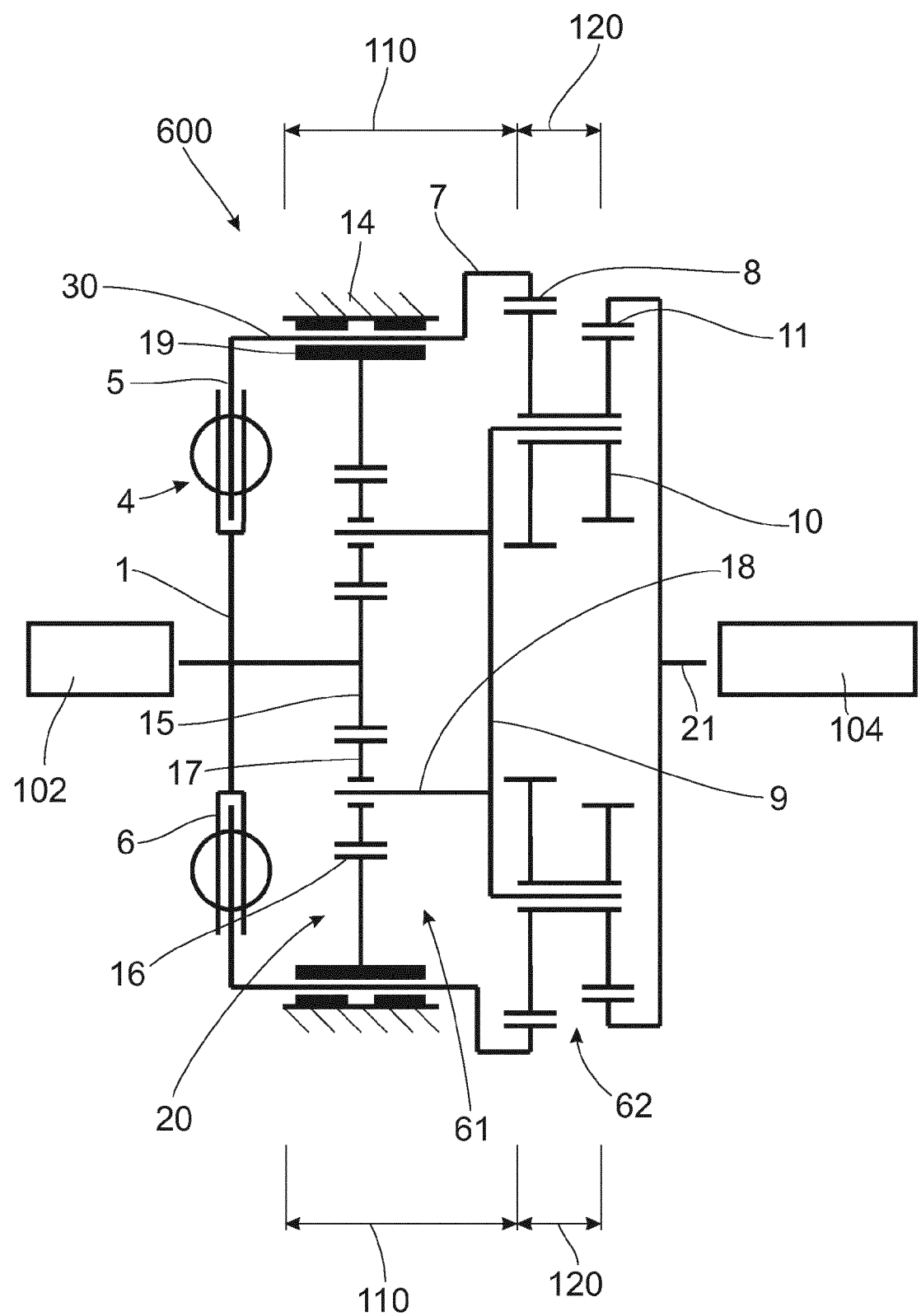
FIG. 6 is a schematic representation of a torsional vibration damping arrangement with electric motor and an actuating gear unit.

FIG. 6 shows a schematic representation of a further torsional vibration damping arrangement 600 according to another embodiment of the present invention. Again, the torque adjusting arrangement 110 has an electric motor 19, 20. The torque adjusting arrangement 110 further comprises an actuating gear unit 61 and is configured such that the electric motor 19, 20 can change a speed ratio of a speed of the first torque transmission path and a speed ratio of a speed of the second torque transmission path in the coupling arrangement 120 via the actuating gear unit 61 such that the speed ratio is higher or lower (depending on application or type of drive) at a first speed of the input-side connection component 1 than at a second speed of the input-side connection component 1 when the first speed is less than the second speed.

In one exemplary implementation, the actuating gear unit 61 can be a planetary gear set in which the ring gear 16 of the planetary gear set has or forms a rotor 19 of the electric motor at an outer side. The sun gear 15 or planet gear carrier 9 can be part of the input-side connection component 1 or can be nonrotatably connected to the input-side connection component 1.

Supplementally, the remarks pertaining to the embodiment examples shown in FIGS. 1 to 5 apply in the present case.

In the concrete example shown in FIG. 6, the input-side connection component 1 (e.g., primary plate), an optional cover plate 2, not shown, the central gear 15 (e.g., sun gear), the planet carrier 18 with planet gears 17 of an additional gear unit or actuating gear unit 61, and the planet carrier 9 with stepped planets 10 form the primary side, i.e., the first torque transmission path. The primary plate 1 is connected to a ring gear carrier 7 via a spring set 4 (phase shifter arrangement), a hub disk 5 and shroud plates 6. The input ring gear 8 is located at the ring gear carrier 7. Instead of the direct connection of the planet gear carrier 9 of the coupling gear unit (coupling arrangement) to the primary plate 1, an additional actuating gear unit 61 is now connected therebetween. This is implemented via a central gear 15 (sun gear). The central gear 15 meshes with the planet gears 17 of the actuating gear unit 61 which in turn mesh with the second central gear 16 (ring gear). The planet carrier 9 of the coupling gear unit 61 is nonrotatably connected to the planet carrier 18 of the actuating gear unit 61. The central gears 15, 16 (e.g., sun gear and ring gear) can have an inner toothing and an outer toothing. The planet carrier 9 carries the stepped planet gears 10 (planet gear pairings). The output ring gear 11 is operatively connected to the stepped planet gears 10. The actuating gear unit 61 is connected to an electric motor. The rotor 19 is nonrotatably connected to a central gear 16 (e.g., ring gear). The stator 20 can be nonrotatably connected to the transmission housing 14. Between these two components, the intermediate mass 30 or one of the component parts fixedly connected to it can have a rotational degree of freedom.

An additional actuating gear unit 61 having two central gears 15, 16 and one or more planet gears 17 is installed between the primary plate 1 and planet gear carrier 9 of the coupling gear unit. One of the central gears (sun gear or ring gear) is driven by an electric motor having rotor 19 and stator 20. In this way, by means of the electric motor, the planet gear carrier 9 can be acted upon in a speed-dependent and load-dependent manner by an additional torque which can damp higher engine orders or reinforce the main engine order so as to enable an improved or ideal decoupling. The actuating gear unit 61 (compared to FIG. 5) can reinforce the torque of the electric motor which acts on the planet gear carrier 9 so that the electric motor can have smaller dimensions.

A power split with fixed variable drive can be realized by the embodiment shown in FIG. 6.

In some embodiments, the torque adjusting arrangement 110 includes control electronics (e.g., controller or control clutch) with a sensor element and an actuator unit for adjusting the torque transmission ratio (e.g., actuating member or clutch actuator). The control electronics cause the actuator unit to change the torque transmission ratio depending on a sensor signal of the sensor element. To this end, for example, the sensor element can measure a speed, a change in speed, a rotational irregularity, a load and/or a change in load and can transmit a corresponding sensor signal to the control electronics. In other words, the torque adjusting arrangement can have control electronics which include at least one sensor and, depending on sensor signals, control an actuator for adjusting the torque transmission ratio.

The sensor element can be arranged, for example, at the output-side connection component 21 or at a shaft connecting to the output-side connection component 21, and the actuator unit can be an electric motor. Alternatively, the sensor element can also be arranged at the input-side connection component 1 or at a shaft connecting to the input-side connection component 1, and the actuator unit can be a clutch arrangement. The system can be, e.g., a semi-active system or active system with control circuit. In an active system, the clutch arrangement can be actuated directly by the actuator unit, for example. In a semi-active system, a valve can be adjusted by the actuator unit, for example, so that a fluid can actuate the clutch arrangement (e.g., by means of centrifugal force).

In addition, the control electronics can be configured with a controller so that an actual value is continuously detected and compared with a reference value in order to change the torque transmission ratio automatically or in a self-contained manner without external intervention.

Figure 7:
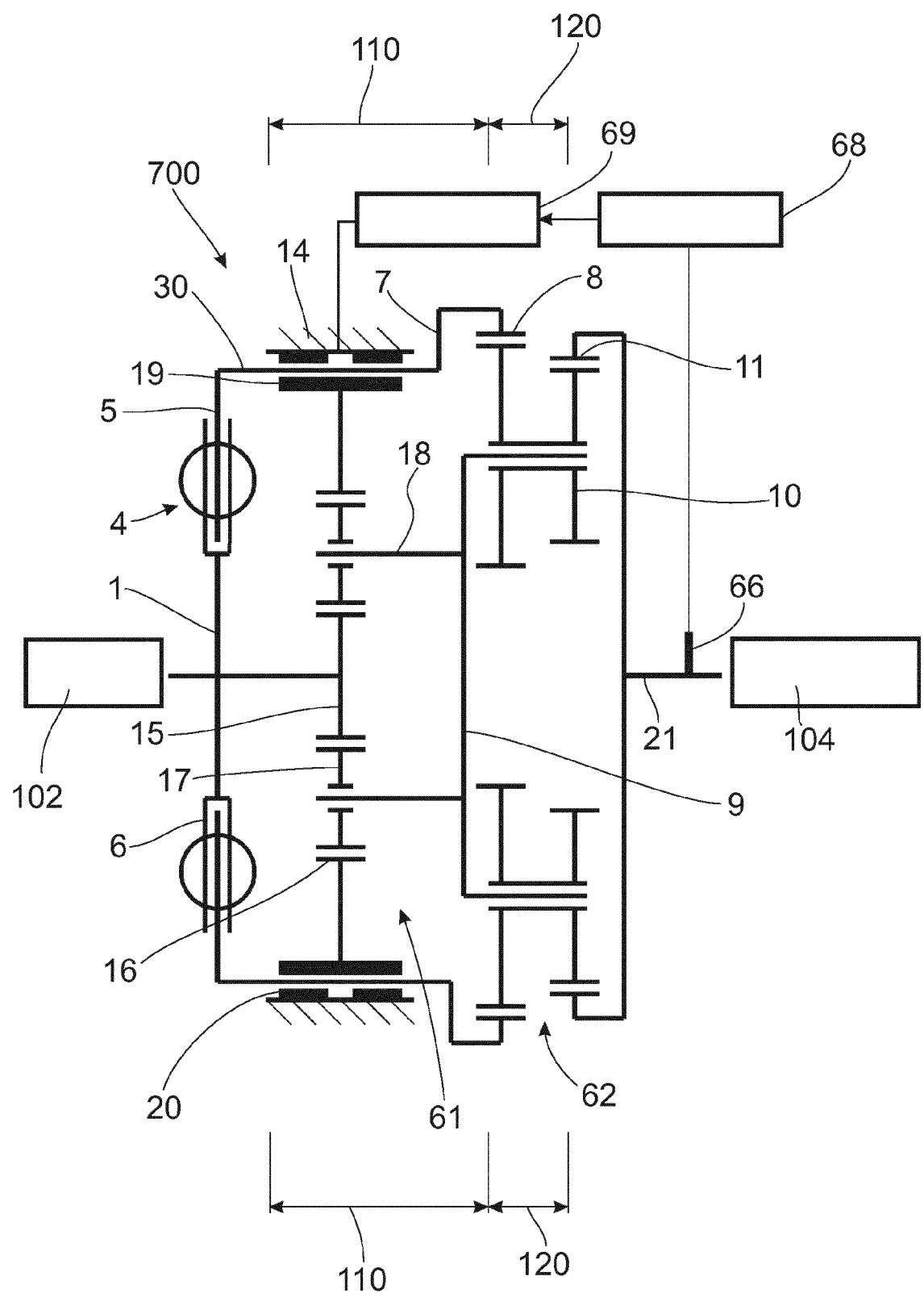
FIG. 7 is a schematic representation of a torsional vibration damping arrangement with controlled electric motor at an additional gear unit.

FIG. 7 shows a schematic representation of a further torsional vibration damping arrangement 700 according to a further embodiment of the present invention. Torsional vibration damping arrangement 700 is similar to the torsional vibration damping arrangement from FIG. 6. The primary plate 1, the first central gear 15, the planet carrier 18 with planet gears 17 of the additional gear unit, and planet carrier 9 with stepped planets 10 form the primary side. The primary plate 1 is connected to the ring gear carrier 7 via spring set 4, hub disk 5 and shroud plates 6. The input ring gear 8 is located at the ring gear carrier 7. Instead of a direct connection of the planet gear carrier 9 of the coupling gear unit to the primary plate 1, an additional actuating gear unit 61 is connected therebetween. This is implemented via a central gear 15. The central gear 15 meshes with the planet gears 17 of the actuating gear unit 61 which in turn mesh with the second central gear 16. The planet carrier 9 of the coupling gear unit is nonrotatably connected to the planet carrier 18 of the actuating gear unit 61. The central gears 15, 16 can have an inner toothing and an outer toothing. The planet carrier 9 carries the stepped planet gears 10. The output ring gear 11 is operatively connected to the stepped planet gears 10. The actuating gear unit 61 is connected to an electric motor. The rotor 19 is nonrotatably connected to a central gear 16. The stator 20 is nonrotatably connected to the transmission housing 14. Between these two components, the ring gear carrier 7 or one of the component parts fixedly connected to it has a rotational degree of freedom. A sensor element 66 is arranged at the transmission input shaft 21. This sensor element 66 can detect the speed and/or the rotational irregularity. The sensor element 66 guides the measurement values to the controller (control electronics 68) which sends the controlled variables to the actuating member (actuator unit 69) of the electric motor.

In other words, an additional actuating gear unit 61 comprising two central gears 15, 16 and one or more planet gears 17 is installed between the primary plate 1 and the planet carrier 9 of the coupling gear unit. One of the central gears is actively driven by an electric motor having a rotor 19 and a stator 20. In this way, by the electric motor the planet gear carrier 9 can be acted upon in a speed-dependent and/or load-dependent manner by an additional torque which, e.g., can damp higher engine orders or reinforce the main engine order so as to enable an ideal decoupling. The actuating gear unit 61 reinforces the torque of the electric motor which acts on the planet gear carrier 9 so that the electric motor can have smaller dimensions. A sensor element 66 which can detect speed or changes in speed and/or loads or changes in load is arranged at the transmission input shaft 21. The detected information is sent to the controller which, depending on the input variables, sends the controlled variables to the actuating member of the electric motor which in turn controls the electric motor.

Supplementally, the remarks pertaining to the embodiments shown in FIGS. 1 to 6 apply in the present case.

By means of the example shown in FIG. 7, a power split with controlled E-motor (electric motor) can be realized at additional gear unit.

Figure 8:
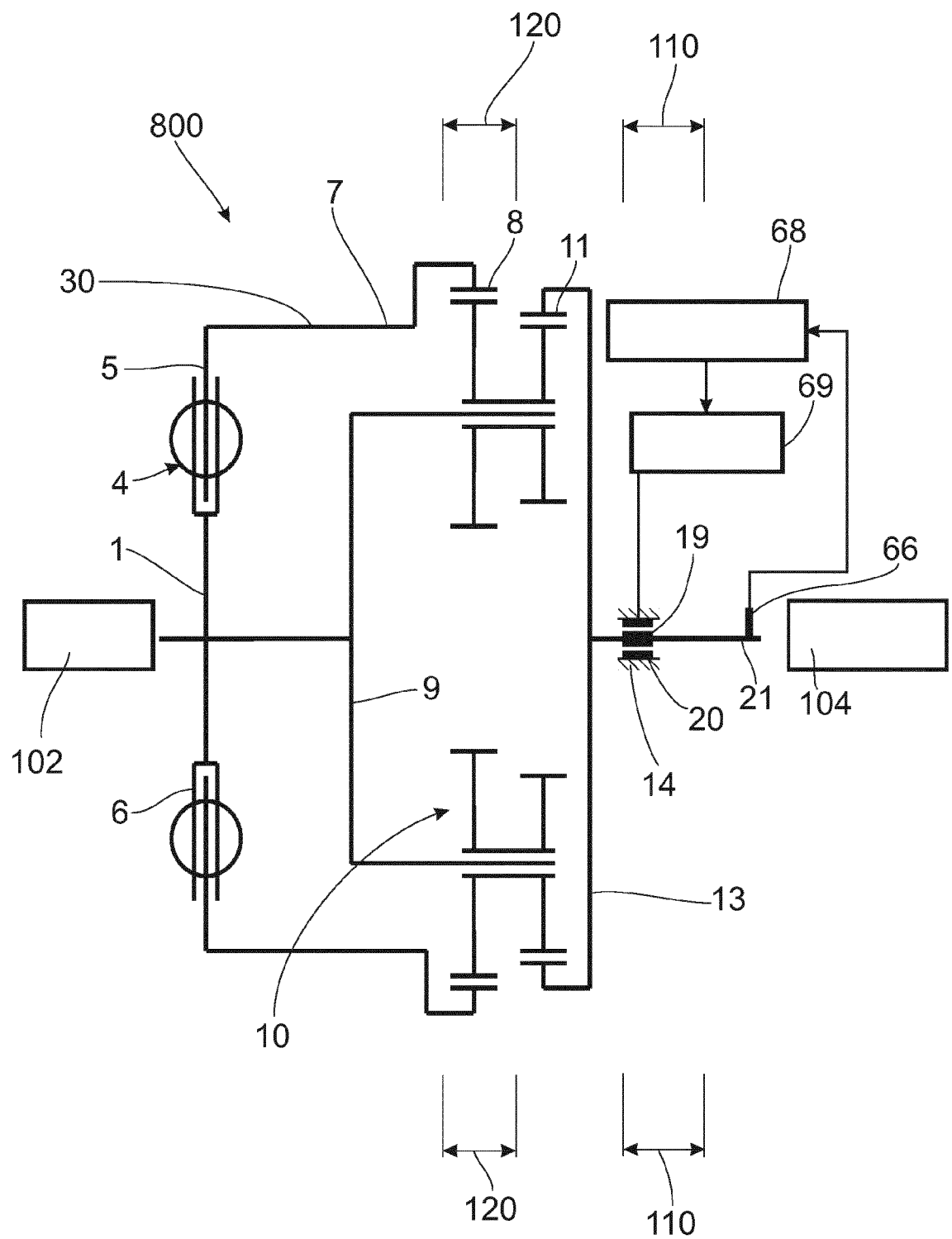
FIG. 8 is a schematic representation of a torsional vibration damping arrangement with controlled electric motor at a crankshaft.

FIG. 8 shows a schematic representation of a further torsional vibration damping arrangement 800 according to an embodiment of the present invention. Torsional vibration damping arrangement 800 is similar to the torsional vibration damping arrangement from FIG. 6. The primary plate 1 and planet carrier 9 with stepped planets 10 form the primary side. The primary plate 1 is connected to the ring gear carrier 7 via spring set 4, hub disk 5 and shroud plates 6. The input ring gear 8 is located at the ring gear carrier 7. The planet carrier 9 carries the stepped planet gears 10. The output ring gear 11 is operatively connected to the stepped planet gears 10. The transmission input shaft 21 is nonrotatably connected to the rotor 19 of the electric motor as is shown. The stator 20 is nonrotatably connected to the transmission housing 14. A sensor element 66 is arranged axially between electric motor and transmission and supplies data to a controller (control electronics 68) which sends the controlled variables to the actuating member (actuator unit 69) of the electric motor.

In other words, the transmission input shaft 21 is actively acted upon by the electric motor 19, 20 in a speed-dependent and/or load-dependent manner by an additional torque which reduces the residual rotational irregularity remaining at the secondary flywheel 13 so as to enable an even better decoupling. A sensor element 66 which can detect speed and/or load is arranged at the transmission input shaft 21. The detected information is sent to the controller which, depending on the input variables, sends the controlled variables to the actuating member of the electric motor which in turn operates the electric motor.

Supplementally, the remarks pertaining to the embodiments shown in FIGS. 1 to 7 apply in the present case.

With the embodiment shown in FIG. 8, a power split with controlled E-motor (electric motor) at the crankshaft can be realized, for example.

Figure 9:
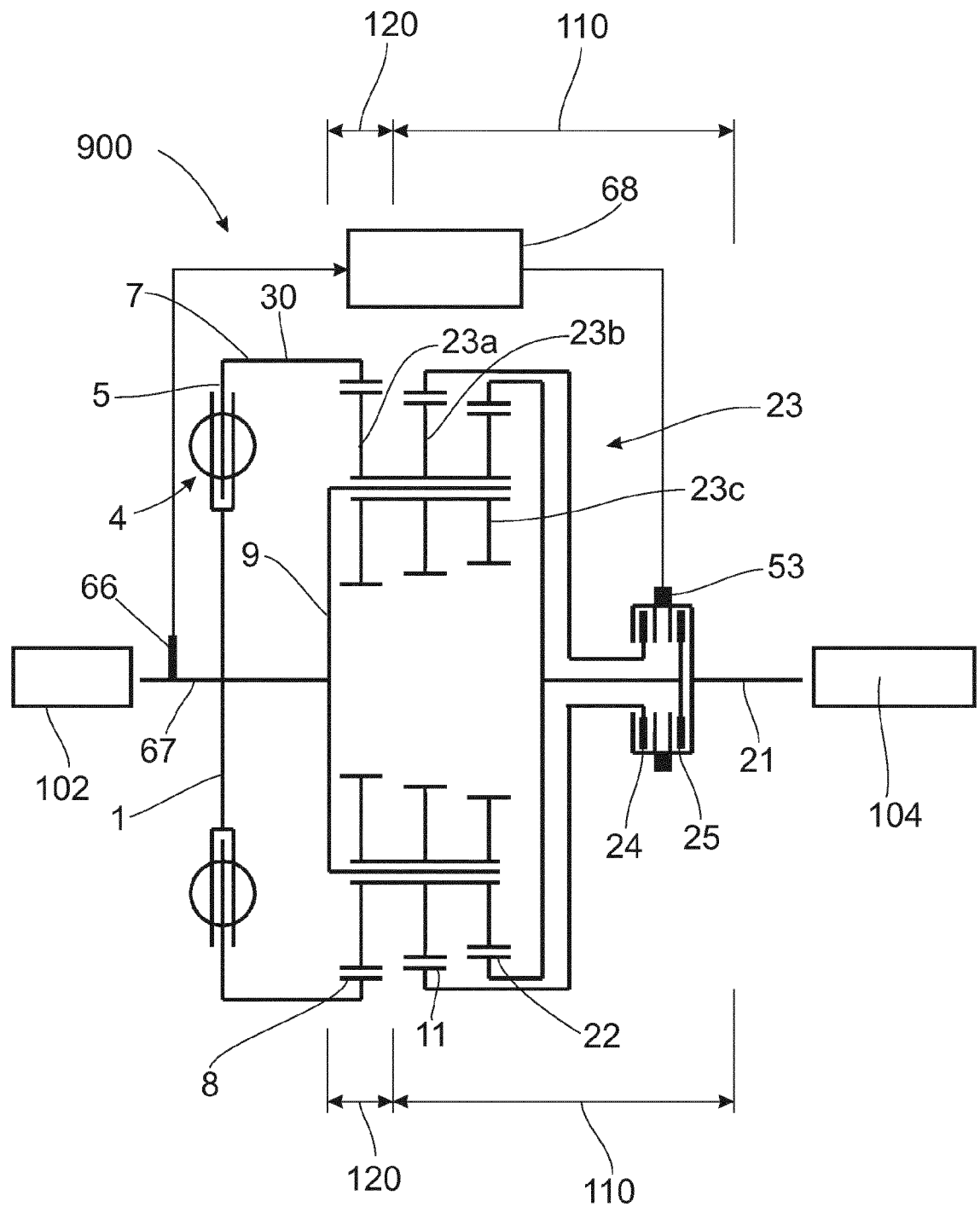
FIG. 9 is a schematic representation of a torsional vibration damping arrangement with switchable output gear sets.

FIG. 9 shows a schematic representation of a further torsional vibration damping arrangement 900 according to yet another embodiment of the present invention. Torsional vibration damping arrangement 900 is similar to the torsional vibration damping arrangement shown in FIG. 1. The planet gear carrier 9 carries the stepped planet gears 23 a-c with three toothings, at least two of which have different numbers of teeth. All three toothings are nonrotatably connected to one another. The two output ring gears 11, 22 and the input ring gear 8 are operatively connected to the stepped planet gears 23. The frictional engagement between the output ring gears 11, 22 and the secondary flywheel 13 is produced via clutches 24, 25. A sensor element 66 is arranged at the crankshaft 67 and supplies data to the control circuit which in turn sends the controlled variable to the clutch control (control electronics 68). The clutch control operates the clutch actuator 53. The sensor element or sensor elements 66 can also be arranged at different locations or at a plurality of different locations. For example, load detection means can be favorably implemented at spring set 4.

In other words, for implementing a variable gear ratio, two or more output ring gears 11, 22 and the associated planet gears are installed. The planet gears can be alternately switched by clutch mechanisms 24, 25 into the power flow between planet carrier 9 and secondary flywheel 13. The clutch mechanism can be implemented by means of friction engagement, positive engagement or bonding engagement. Alternatively, it is also possible to switch two of more ring gears or planetary gear sets into the power flow between input-side ring gear carrier 7 and planet carrier 9. A sensor element is arranged at the crankshaft 67 and can detect speed or changes in speed and/or loads or changes in load. The detected information is sent to the clutch control which, depending on the input variables, operates the actuator of the clutch 53 actively or semi-actively. A purely passive centrifugal force-dependent clutch shifting is also conceivable.

Supplementally, the remarks pertaining to the embodiments shown in FIGS. 1 to 8 apply in the present case.

With the embodiment shown in FIG. 9, a power split with switchable output gear sets (load detection and/or speed detection through sensors) can be realized, for example.

Alternatively or optionally, the torque adjusting arrangement 110 can be configured to change the torque transmission ratio mechanically (e.g., by a centrifugal clutch) in a speed-dependent manner utilizing centrifugal force. This can be integrated, for example, in a torsional vibration damping arrangement such as that shown in FIGS. 1 to 3.

Some embodiments relate to a rotational irregularity reduction through power splitting with variable coupling gear ratio. The described concept offers a system for reducing rotational irregularities (rotational irregularity reduction). In order to achieve an optimum or best possible reduction of rotational irregularities in every speed range or in some speed ranges, a speed-adaptive transmission gear ratio can be used to damp rotational irregularities completely or virtually completely. The described embodiments show a possibility for a power split which allows a speed-adapted improvement or optimization of vibration decoupling by means of varying the transmission gear ratio. This can be realized, for example, in a very compact axial installation space. The operating principle of power splitting can be used to reduce rotational irregularities.

Figure 10:
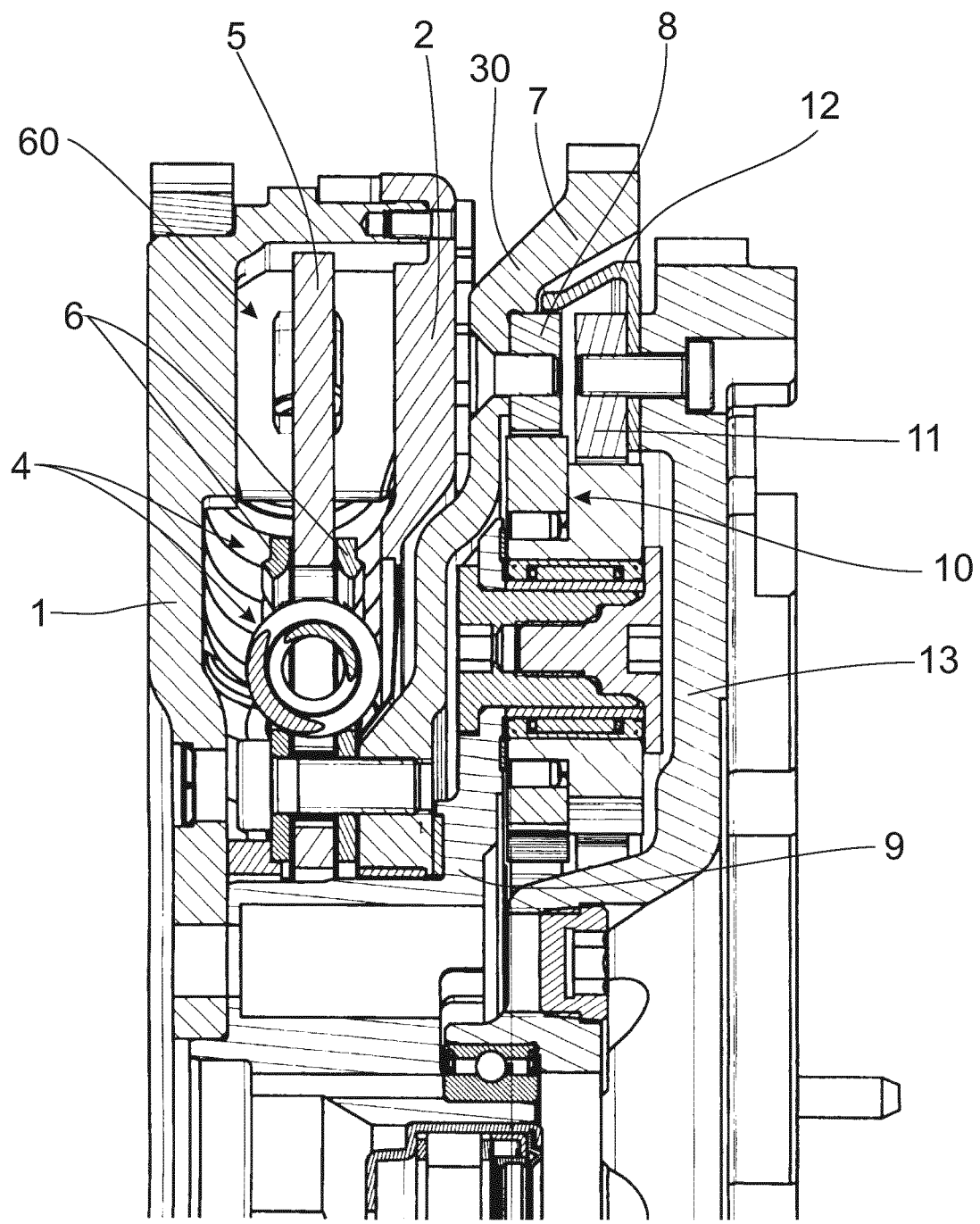
FIG. 10 is a schematic cross section through one half of a torsional vibration damping arrangement.

FIG. 10 shows a schematic half-section through an overall system. A primary plate 1, a spring set 4, a shroud plate 6, a hub disk 5, a cover plate 2, an intermediate mass 30, an input ring gear 8, a sealing plate 12, an output ring gear 11, a planet gear 10, a secondary flywheel 13, a planet gear carrier 9 and a spring disk 60 are shown. The corresponding elements show a possible formation, positioning and cooperation as a possible configuration of a torsional vibration damping arrangement shown above referring to FIGS. 1 to 6. Supplementally, the remarks pertaining to the examples described above apply accordingly.

Some embodiments relate to a method for damping torsional vibrations, particularly for a powertrain of a vehicle, with a torsional vibration damping arrangement. The torsional vibration damping arrangement has an input-side connection component, an output-side connection component, a first torque transmission path arranged between the input-side connection component and the output-side connection component, a first torque transmission path arranged between the input-side connection component and the output-side connection component, a second torque transmission path arranged parallel to the first torque transmission path between the input-side connection component and the output-side connection component, a phase shifter arrangement and a torque adjusting arrangement. The phase shifter arrangement is arranged in the first torque transmission path or second torque transmission path and is configured to generate a phase shift of rotational irregularities guided via the first torque transmission path relative to rotational irregularities guided via the second torque transmission path. Further, the torque adjusting arrangement is configured to change a torque transmission ratio between a first torque component which is transmitted via the first torque transmission path and a second torque component which is transmitted via the second torque transmission path. The method includes changing the torque transmission ratio through the torque adjusting arrangement.

The method can have further optional, additional or alternative method steps which correspond to optional, additional or alternative configurations of the concepts described above.

The features disclosed in the preceding description, appended claims and drawings can be significant individually as well as in any combination for implementing the invention in its various refinements.

While some aspects of the present invention have been described in connection with an apparatus, it will be appreciated that these aspects also represent a description of a corresponding method so that a module or a component of an apparatus is also to be comprehended as a corresponding method step or as a feature of a method step. Similarly, aspects which have been described in connection with, or as, a method step also represent a description of a corresponding module or detail or feature of a corresponding apparatus.

The embodiments described above merely represent an illustration of the principles of the present invention. It will be appreciated that modifications and variations of the arrangements and details described herein will be clear to other skilled persons. Therefore, it is intended that the invention be limited only by the protective scope of the appended patent claims and not by the specific details which were presented herein with reference to the description and explanation of the embodiments.

The invention claimed is:

1. A torsional vibration damping arrangement (100, 200, 300, 400, 500, 600, 700, 800, 900), particularly for a powertrain of a vehicle, the torsional vibration damping arrangement comprising:
   an input-side connection component (1);
   an output-side connection component (21);
   a first torque transmission path arranged between the input-side connection component (1) and the output-side connection component (21);
   a second torque transmission path arranged parallel to the first torque transmission path between the input-side connection component (1) and the output-side connection component (21);
   a coupling arrangement (120);
   a phase shifter arrangement (4) arranged in the first torque transmission path or second torque transmission path and configured to generate a phase shift of rotational irregularities guided via the first torque transmission path relative to rotational irregularities guided via the second torque transmission path, the phase shifter arrangement (4) having an output-side formed by an input-side ring gear (8) meshing with a planet gear (23a) of the coupling arrangement (120);
   and a torque adjusting arrangement (110) configured to change a torque transmission ratio between a first torque component transmitted via the first torque transmission path and a second torque component transmitted via the second torque transmission path.

2. The torsional vibration damping arrangement according to claim 1, wherein the torque adjusting arrangement (110) is configured to change the torque transmission ratio such that the torque transmission ratio is greater at a first speed of the input-side connection component (1) than at a second speed of the input-side connection component (1) when the first speed is less than the second speed.

3. The torsional vibration damping arrangement according to claim 1, wherein the coupling arrangement (120) is configured to superpose the first torque component with the second torque component, and wherein the torque adjusting arrangement (110) is arranged in the first torque transmission path, in the second torque transmission path or between the coupling arrangement (120) and the output-side connection component (21).

4. The torsional vibration damping arrangement according to claim 3, additionally comprising a planet gear carrier (9), the coupling arrangement (120) includes a planet gear (23a) and wherein the torque adjusting arrangement (110) comprises at least two planet gears (23b, 23c) having different outer diameters and at least two output-side ring gears (11, 22) having correspondingly different inner diameters and operatively connected to the planet gears (23b, 23c), wherein the torque adjusting arrangement (110) further comprises a clutch arrangement (26) configured to adjustably bring one of the at least two planet gears (23b, 23c) of the torque adjusting arrangement (110) in operative connection to the planet gear (23a) of the coupling arrangement (120), and wherein the planet gear (23a) of the coupling arrangement (120) is operatively connected to the first torque transmission path via the planet gear carrier (9) and is operatively connected to the second torque transmission path via the input-side ring gear (8).

5. The torsional vibration damping arrangement according to claim 3, wherein the torque adjusting arrangement (110) comprises at least two planet gears (23b, 23c) having different outer diameters and being nonrotatably connected to one another and at least two output-side ring gears (11, 22) having correspondingly different inner diameters and being operatively connected to the planet gears (23b, 23c); and wherein the torque adjusting arrangement (110) further comprises a clutch arrangement (24, 25) configured to adjustably bring one of the at least two output-side ring gears (11, 22) into operative connection to the output-side connection component (21).

6. The torsional vibration damping arrangement according to claim 4, wherein the at least two planet gears (23b, 23c) of the torque adjusting arrangement (110) are nonrotatably connected to the planet gear (23a) of the coupling arrangement (120); wherein the planet gear (23a) of the coupling arrangement (120) is connected to the first torque transmission path via the planet gear carrier (9) carrying the nonrotatable planet gears (23a, 23b, 23c); and wherein the planet gear (23a) of the coupling arrangement (120) is operatively connected to the input-side ring gear (8).

7. The torsional vibration damping arrangement according to claim 6, wherein the torque adjusting arrangement (110) is configured such that a smaller inner diameter of an output-side ring gear (11, 22) is brought into operative connection with the output-side connection component (21) via the clutch arrangement (24, 25) at a first speed of the input-side connection component (1) than at a second speed of the input-side connection component (1) when the first speed is less than the second speed.

8. The torsional vibration damping arrangement according to claim 3, wherein the torque adjusting arrangement (110) is arranged in the second torque transmission path and has at least two planet gears which have different outer diameters and which are nonrotatably connected to one another and at least two input-side ring gears which have correspondingly different inner diameters and which are operatively connected to the planet gears; and wherein the torque adjusting arrangement further has a clutch arrangement which is configured to adjustably bring one of the at least two input-side ring gears into operative connection with the second torque transmission path.

9. The torsional vibration damping arrangement according to claim 1, wherein the torque adjusting arrangement (110) comprises an electric motor (19, 20); and wherein the torque adjusting arrangement (110) is configured such that the electric motor (19, 20) introduces a torque into the first torque transmission path or into the second torque transmission path or removes a torque from the first torque transmission path or from the second torque transmission path for changing the torque transmission ratio.

10. The torsional vibration damping arrangement according to claim 9, wherein the torque adjusting arrangement (110) further comprises an actuating gear unit (61) and is configured such that the electric motor (19, 20) changes a speed ratio of a speed of the first torque transmission path and of a speed of the second torque transmission path in the coupling arrangement (120) via the actuating gear unit (61) such that the speed ratio is higher or lower at a first speed of the input-side connection component (1) than at a second speed of the input-side connection component (1) when the first speed is less than the second speed.

11. The torsional vibration damping arrangement according to claim 10, wherein the actuating gear unit (61) is a planetary gear set having a ring gear (16), a sun gear (15) and a planet gear carrier (9); wherein the ring gear (16) of the planetary gear set forms a rotor (19) of the electric motor at an outer side; and wherein the sun gear (15) of the actuating gear unit (61) or the planet gear carrier (9) of the actuating gear unit (61) is part of the input-side connection component (1) or is nonrotatably connected to the input-side connection component (1).

12. Torsional vibration damping arrangement according to claim 1, wherein the torque adjusting arrangement (110) includes control electronics (68) with a sensor element (66) and an actuator unit (53, 69) for adjusting the torque transmission ratio; and wherein the control electronics (68) are configured to cause the actuator unit (53, 69) to change the torque transmission ratio depending on a sensor signal of the sensor element (66).

13. The torsional vibration damping arrangement according to claim 12, wherein the control electronics (68) is configured with a controller, wherein an actual value is continuously detected and compared with a reference value in order to change the torque transmission ratio automatically or in a self-contained manner without external intervention.

14. The torsional vibration damping arrangement according to claim 12, wherein the sensor element (66) is arranged at the output-side connection component (21) or at a shaft connecting to the output-side connection component (21); and the actuator unit (69) is an electric motor.

15. The torsional vibration damping arrangement according to claim 12, wherein the sensor element (66) is arranged at the input-side connection component (1) or at a shaft connecting to the input-side connection component (1); and the actuator unit (53) actuates a clutch arrangement.

16. The torsional vibration damping arrangement according to claim 1, wherein the torque adjusting arrangement (110) is configured to change the torque transmission ratio mechanically depending on speed by utilizing centrifugal force.

17. A method for damping torsional vibrations, particularly for a powertrain of a vehicle, having a torsional vibration damping arrangement (100, 200, 300, 400, 500, 600, 700, 800, 900), wherein the torsional vibration damping arrangement has an input-side connection component (1); an output-side connection component (21); a first torque transmission path arranged between the input-side connection component (1) and the output-side connection component (21); a second torque transmission path arranged parallel to the first torque transmission path between the input-side connection component (1) and the output-side connection component (21); a phase shifter arrangement (4) and a torque adjusting arrangement (110), wherein the phase shifter arrangement (4) is arranged in the first torque transmission path or second torque transmission path and is configured to generate a phase shift of rotational irregularities guided via the first torque transmission path relative to rotational irregularities guided via the second torque transmission path, wherein the torque adjusting arrangement (110) is configured to change a torque transmission ratio between a first torque component which is transmitted via the first torque transmission path and a second torque component which is transmitted via the second torque transmission path, the torque adjusting arrangement (110) comprising at least two planet gears (23b, 23c) having different outer diameters and at least two output-side ring gears (11, 22), said method comprising the following steps:
changing the torque transmission ratio through the torque adjusting arrangement by selectively engaging one of the at least two planet gears (23*b*, 23*c*) of the torque adjusting arrangement (110) with a respective one of the at least two output-side ring gears via a clutch arrangement (24, 25).

\* \* \* \* \*